United States Patent
Iizuka

[19]

[11] Patent Number: 6,029,198
[45] Date of Patent: Feb. 22, 2000

[54] INFORMATION PROCESSING METHOD AND APPARATUS, AND METHOD AND APPARATUS FOR CONTROLLING NETWORK DEVICES

[75] Inventor: Yoshio Iizuka, Yokohama, Japan

[73] Assignee: Canon Kabushiki Kaisha, Tokyo, Japan

[21] Appl. No.: 09/070,917

[22] Filed: May 4, 1998

[30] Foreign Application Priority Data

May 12, 1997 [JP] Japan ................................. 9-121298

[51] Int. Cl.$^7$ ..................................................... G06F 13/00
[52] U.S. Cl. ........................................................... 709/223
[58] Field of Search ................................. 709/200, 201, 709/202, 203, 217, 218, 219, 220, 221, 222, 223, 224

[56] References Cited

U.S. PATENT DOCUMENTS 5,774,667   6/1998   Garvey et al. ........................... 709/222
5,935,217   8/1999   Sakai et al. ............................. 709/249

*Primary Examiner*—Moustafa M. Meky
*Attorney, Agent, or Firm*—Fitzpatrick, Cella, Harper & Scinto

[57] ABSTRACT

A network device control method and apparatus for controlling various devices connected to a network cause a setting sheet that is for setting the environment of a device to be displayed on a screen so that the environment of the device may be set. A request for read-out of management information corresponding to each control on the setting sheet is transmitted to the network. If read-out of the management information succeeds, the information is set in the corresponding control and the display state thereof is enabled. If read-out fails and the reason is that the device does not support the date, then the name of the control is displayed in gray and the display is not displayed at all. If the function is one supported by the device, on the other hand, then the name of the control is displayed at ordinary brightness and the corresponding data is displayed in gray.

33 Claims, 13 Drawing Sheets

INFORMATION PROCESSING METHOD AND APPARATUS, AND METHOD AND APPARATUS FOR CONTROLLING NETWORK DEVICES

BACKGROUND OF THE INVENTION

This invention relates to a processing method and apparatus for controlling a variety of connected devices, and to a method and apparatus for controlling network devices.

Local area networks (LANs) for interconnecting computers have come into wide use in recent years and can be constructed to interconnect the computers on the same floor of a building, throughout an entire building or among a group of buildings (compound), in a local region or over a wider area. Such networks can also be interconnected to form a network of global scale. There are cases where each LAN among the interconnected LANs lends itself to the interconnection of diverse items of hardware and possesses several network protocols. By contrast, a simple LAN detached from others allows individual users to manage the LAN. In other words, a user can exchange devices connected to the network, install software when necessary and diagnose problems.

If the user of a certain personal computer wishes to change the settings of a device such as a printer connected to the computer via the network, a setting sheet for setting the basic environment of the device is caused to be displayed on the personal computer monitor screen and the user makes the desired settings while observing the screen. Various radio buttons, check boxes and command boxes are displayed on the environment setting screen. The radio buttons and check boxes are capable of being displayed in three states, namely a state indicating that a setting has been completed, a state indicating that the setting has not yet been made, and a state indicating that the particular radio button or check box is not selectable.

However, other boxes such as combo boxes and list boxes are not capable of being displayed in these three states. Accordingly, there is need for display of an environment setting sheet that presents an improved user interface.

SUMMARY OF THE INVENTION

Accordingly, an object of the present invention is to provide an information processing method and apparatus featuring a more efficient user interface obtained by making it possible to display three states for combo and list boxes, etc., when setting the environment of a device connected to a network.

Another object of the present invention is to provide a network device control method and apparatus featuring a more efficient user interface obtained by making it possible to display three states for combo and list boxes, etc., which are used to set the functions of a network device.

A further object of the present invention is to provide an information processing method and apparatus as well as a network device control method and apparatus wherein if an object fails to be acquired even though a device supports the object, a display to this effect can be presented.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

A network device control apparatus according to embodiments of the present invention will be described with reference to the drawings.

(First Embodiment)

Figure 1:
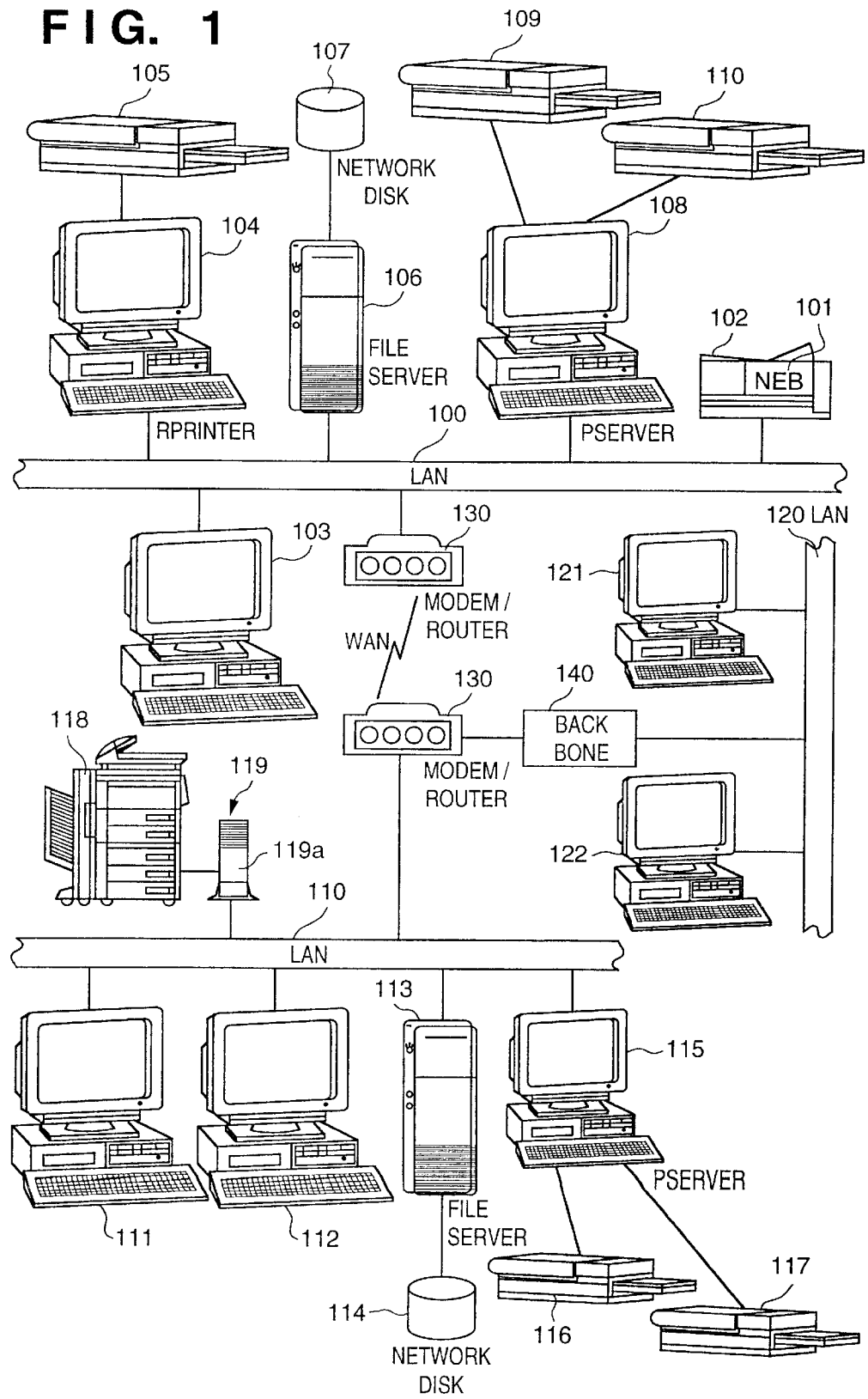
FIG. 1 is a diagram illustrating a case where a network board for connecting a printer according to this embodiment to a network has been connected to a printer having an open architecture.

FIG. 1 illustrates a case, in accordance with this embodiment, in which a network board (NEB) 101 for connecting a printer to a network has been connected to a printer 102 having an open architecture. The NEB 101 is connected to a local area network (LAN) 100 via a LAN interface such as an Ethernet interface 10Base-2 having a coaxial connector or a 10Base-T interface having an RJ-45.

A plurality of personal computers (PCs) such as a PC 103 and a PC 104 also are connected to the LAN 100. The PCs 103, 104 are capable of communicating with the NEB 101 under the control of the network operating system. Under these conditions, one of the PCs, e.g., PC 103, can be designated for use as a network management unit. Further, a printer such as a printer 105 connected to the PC 104 may be connected to the PC 103.

A file server 106 is connected to the LAN 100 and manages access to files that have been stored on a large-capacity (e.g., 10-gigabyte) network disk 107. A printer server (PSERVER) 108 causes a printer such as a locally connected printer 109 [109a, 109b, etc., (not shown)] or a remote printer 105 to perform printing. Other peripherals (not shown) may also be connected to the LAN 100.

More specifically, the network shown in FIG. 1 is capable of using network software such as Novell® or UNIX® software in order that the network members may communicate more efficiently. It is possible to use any network software. For example, Novell Netware® (the registered trademark of Novell, Inc.) software can be used. For a detailed description relating to this software package, refer to the on-line documentation included with the NetWare® package. It is possible to purchase this from Novell along with the NetWare® package.

The arrangement shown in FIG. 1 will now be described in simple terms.

The file server 106 performs the functions of a file management unit so that the members of the LAN may receive data files, these functions also including storing, queuing, caching and transmitting data files. For example, at the time of printing, separate data files that have been created by the PCs 103, 104 are sent to the file server 106. The file server 106 then places the data files in order and, in accordance with a command from the printer server 108, transmits the ordered data files to the printer 109.

The PCs 103 and 104 are ordinary PCs that are capable of generating data files, transmitting the generated data files to the LAN 100, receiving data files from the LAN 100 and displaying and/or processing these files. It should be noted that while these PCs are illustrated in FIG. 1 as being ordinary personal computers, other computers maybe included in the network so long as they are capable of executing the network software. For example, if UNIX® software is being used, UNIX® workstations may be included in the network and these workstations can be used together with the illustrated PCs under suitable conditions.

LANs such as the LAN 100 ordinarily are used to provide service to a user group located on one floor or on a number of successive floors of one building and, to some degree, to a local user group. For example, a wide area network (WAN) would be constructed to deal with a situation in which certain users become more remote from other users, as when certain users are located in another building, prefecture or state. Basically, a WAN is an aggregate of several LANs and is formed by connecting the LANs using high-speed digital lines such as high-speed ISDN (Integrated Services Digital Network) telephone lines. Accordingly, as shown in FIG. 1, a WAN is formed by connecting the LAN 100, a LAN 110 and a LAN 120 via a (modulator/demodulator)/transponder (modem/router) 130 and a backbone 140. These connections are simple electrical connections using a plurality of buses. Each LAN has a dedicated PC and, though not necessarily required, usually includes a file server and a printer server.

Accordingly, as shown in FIG. 1, the LAN 110 includes PCs 111 and 112, a file server 113, a network disk 114, a printer server (PSERVER) 115 and printers 116, 117. By contrast, the LAN 120 includes only PCs 121 and 122. The devices connected to the LANs 100, 110 and 120 can access the functions of the devices of the other LANs via the WAN.

Many organizations for standardization have made attempts to manage the devices in networks that construct large-scale networks of the kind described above. The International Standards Organization (ISO) has proposed a general-purpose standard framework referred to as the Open Systems Interconnection (OSI) model. The OSI model of network management protocol is referred to as the Common Management Information Protocol (CMIP). The CMIP is the common network management protocol used in Europe.

The USA uses a variety of protocol, which is related to the CMIP, referred to as the Simple Network Management Protocol (SNMP). This protocol has a higher degree of universality. [See *Introduction to TCP/IP Networking Management, Toward Practical Management*, by M. T. Rose (translated by Takeshi Nishida), published by Toppan Press, First Edition, Aug. 20, 1992.]

In accordance with the SNMP management technique, a network management system includes at least one network management station (NMS), several managed nodes each of which has an agent, and a network management protocol used in order that management stations and agents may exchange management information. A user is capable of acquiring and changing data on the network by communicating with the agent software of a managed node using the network management software at the NMS.

An agent is software that runs as a background process in regard to each target device. When a user requests a network device for management data, the management software places object identification information in a management packet or frame and sends the packet or frame to the target agent. The agent interprets the object identification information, fetches the data corresponding to the object identification information, places the data in a packet and sends the packet back to the user. There are occasions where the corresponding process is called in order to fetch the data.

Figure 4:
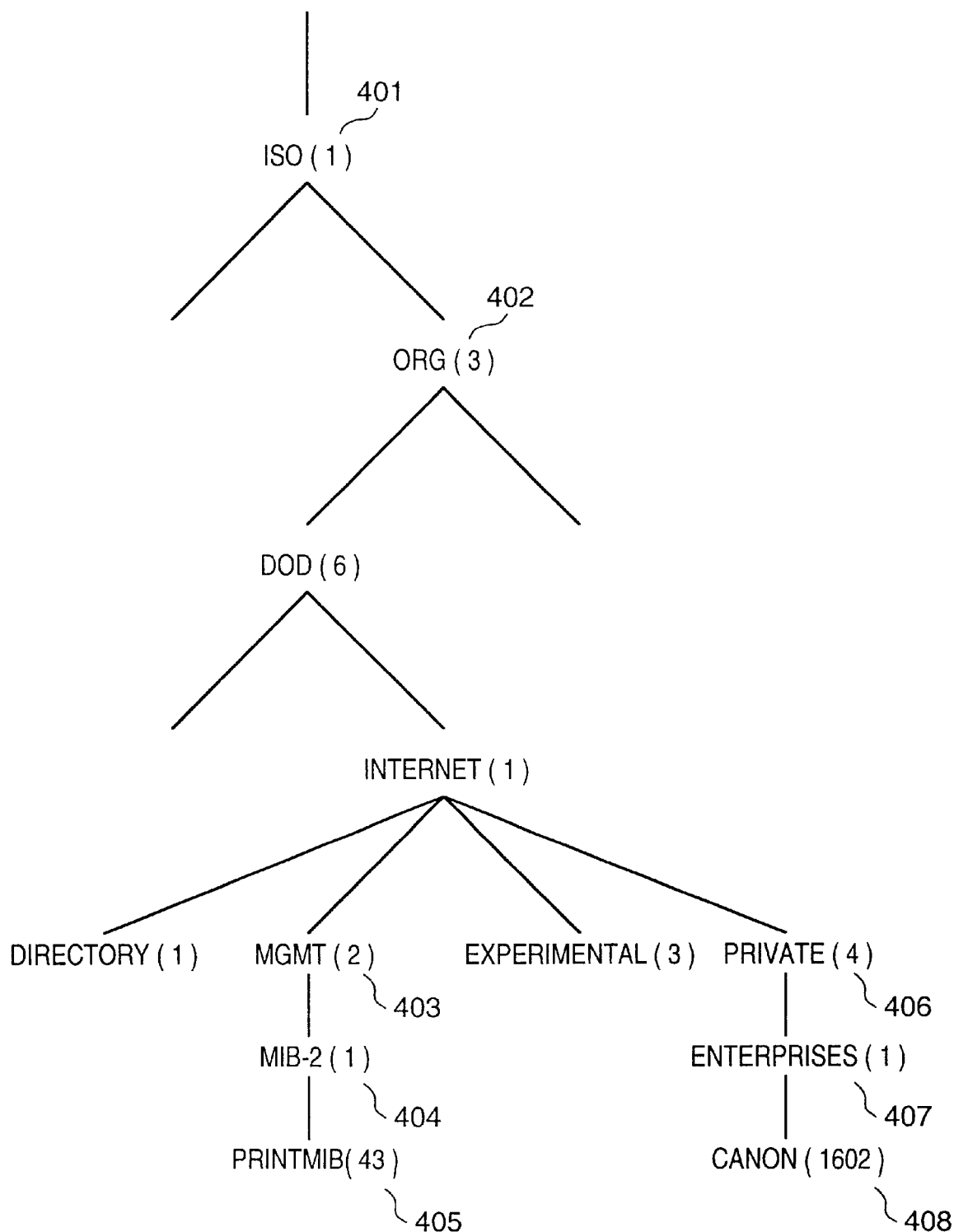
FIG. 4 is a conceptual view showing the structure of an MIB (Management Information Base)

Further, an agent possesses, in a database format, data relating to its own status. This database is referred to as an MIB (Management Information Base). FIG. 4 is a conceptual view showing the structure of an MIB. The MIB holds data in a tree structure, as shown in FIG. 4, and all nodes are uniquely numbered. The numbered enclosed by parentheses in FIG. 4 are node identifiers. For example, the identifier of node 401 in FIG. 4 is "1". Since the identifier of node 402 is "3" under node 401, it is written "1•3". Similarly, the identifier of node 403 is written "1•3•6•1•2". The identifiers of nodes are referred to as "object identifiers".

The structure of this MIB is referred to as SMI (Structure of Management Information) and is stipulated by RFC 1155 "Structure and Identification of Management Information for TCP/IP-based Internets".

Only part of an MIB stipulated as the standard is extracted as shown in FIG. 4.

Node 404 is a node at the apex of an object group referred to as a standard MIB, with which devices managed by the SNMP are regularly equipped. The details of the structures of objects under this node are specified by RFC 1213 "Management Information Base for Network Management of TCP/IP-based Internets: MIB-II". Node 405 is a node at the apex of an object group referred to as a printer MIB, with which printers managed by the SNMP are regularly equipped. The details of the structure of objects under this node are specified by RFC 1759 "Printer MIB". Furthermore, node 406 is referred to as a "private MIB" and is a node at an apex that allows an enterprise or association to define its own MIB. Node 407 is referred to as an enterprise extension MIB and is a node at an apex that allows an enterprise to implement its own extensions in the private MIB.

<<Installing an agent on a network board>>

The installation of an agent on a network board for connecting a printer to a network will be considered as an example of agent installation. This makes it possible to place the printer under the management of the network management software. By using the network management software, a user can obtain information on the printer under control and can modify the status of the printer. More specifically, the user can get the character string being displayed on a liquid crystal display panel of the printer, for example, and can change the paper supply cassette that is the default. An example in which a network board (NEB) with an installed agent is connected to a printer will be now described.

Figure 2:
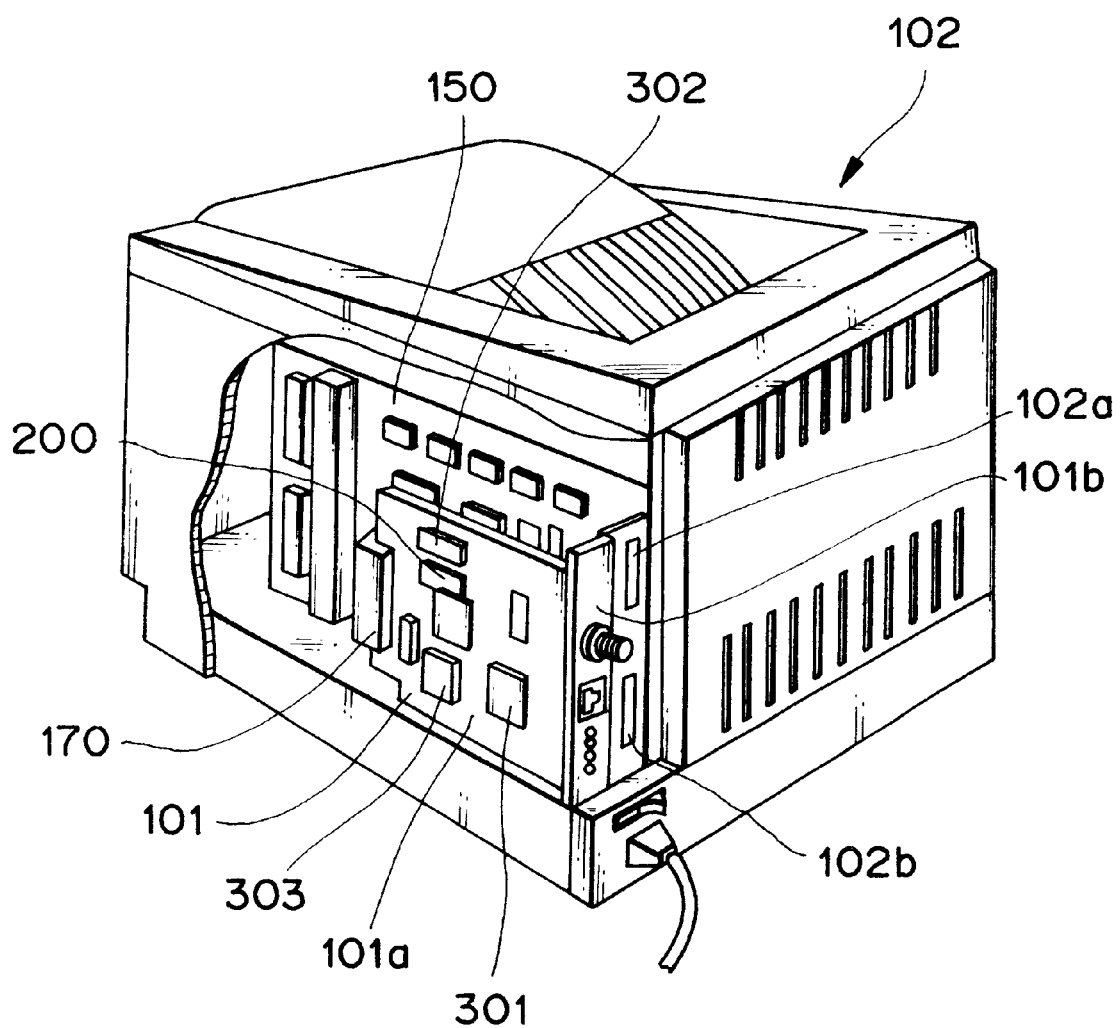
FIG. 2 is a view, partially broken away, illustrating an embodiment in which a network board with an installed agent is connected to a printer.

As shown in FIG. 2, the NEB 101 is preferably incorporated in an internal expansion I/O slot of the printer 102. The NEB 101 is an "embedded" network node having the processing and data storage functions indicated below. Adopting this arrangement of the NEB 101 is advantageous in that distinctive auxiliary features are obtained for supervising and managing a large, multi-area WAN. These auxiliary functions include printer control and status monitoring from a remote location (the office of the network administrator) on the network, automatic management of printer configuration in order to provide a guaranteed initialized environment for the next user after each printing job, and provision of a printer log or statistics on use, accessible via the network, in order to characterize printer load or produce a schedule for toner cartridge replacement.

An important factor in this NEB design is a function. that allows the NEB 101 to access printer-control status information via a bi-directional interface such as a shared memory 200. An interface such as an SCSI interface can be used instead of a shared memory. As a result, printer operating information can be sent to the NEB 101 or to an external network node in such a manner that the programs of a large number of convenient auxiliary functions can be run. A block for print image data and control information is constituted by a microprocessor 301 on the NEB 101 and is described in the shared memory 200 and read in by the printer 102. Similarly, printer status information is sent from the printer 102 to the shared memory 200, whence the information is read in by the microprocessor 301 on the NEB 101.

FIG. 2 is a view, partially broken away, illustrating the printer 102 having the installed NEB 101. As shown in FIG. 2, the NEB 101 is composed of a printed circuit board 101a on which a face plate 101b for network connection has been placed. The NEB 101 is connected to a printer interface card 150 via a connector 170. The printer interface card 150 directly controls the printer engine of the printer 102. Print data and printer status commands are input from the NEB 101 to the printer interface card 150 via the connector 170, and printer status information is obtained from the printer interface card 150 via the connector 170. The NEB 101 transmits this information to the LAN 100 via the network connector of the face plate 101b. At the same time, the printer 102 is capable of receiving print data from an ordinary serial port 102a and parallel port 102b.

Figure 3:
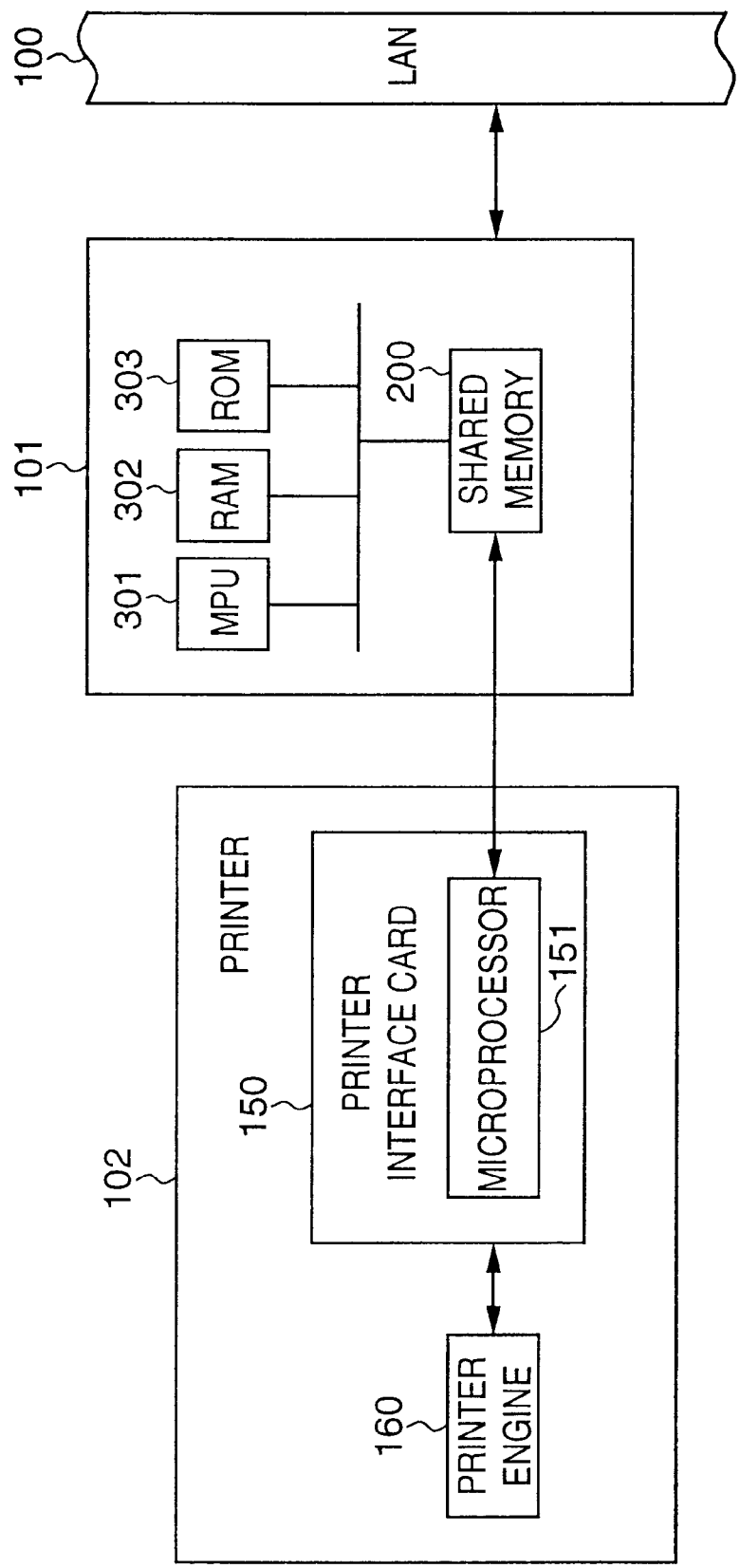
FIG. 3 is a block diagram illustrating the electrical connections among a network board, a printer and a LAN.

FIG. 3 is a block diagram illustrating the electrical connections among the NEB 101, printer 102 and LAN 100. The NEB 101 is directly connected to the LAN 100 via the LAN interface and to the printer 102 via the printer interface card 150. Provided on the NEB 101 are the microprocessor (MPU) 301 for controlling the NEB 101, a ROM 303 for storing the operating program of the microprocessor 301, a RAM 302 used as a work area when the microprocessor 301 executes a program, and the shared memory 200 that allows the NEB 101 and printer interface card 150 to exchange data with each other. These components on the NEB 101 are interconnected through an internal bus. A program that allows the NEB 101 to operate as an SNMP agent is stored in the ROM 303. The microprocessor 301 operates in accordance with the program that has been stored in the ROM 303 and uses the RAM 302 as a work area. The microprocessor 301 uses the shared memory 200 as a buffer area for two-way communication with the printer interface card 150.

A microprocessor 151 on the printer interface card 150 accesses data in the NEB 101 via the shared memory 200 provided in the NEB 101. The microprocessor 151 on the printer interface card 150 communicates also with a printer engine 160, which actually drives the printing mechanism of the printer 102.

<<Construction of the PC side>>

The construction of the PC that runs the network management software will now be described.

Figure 5:
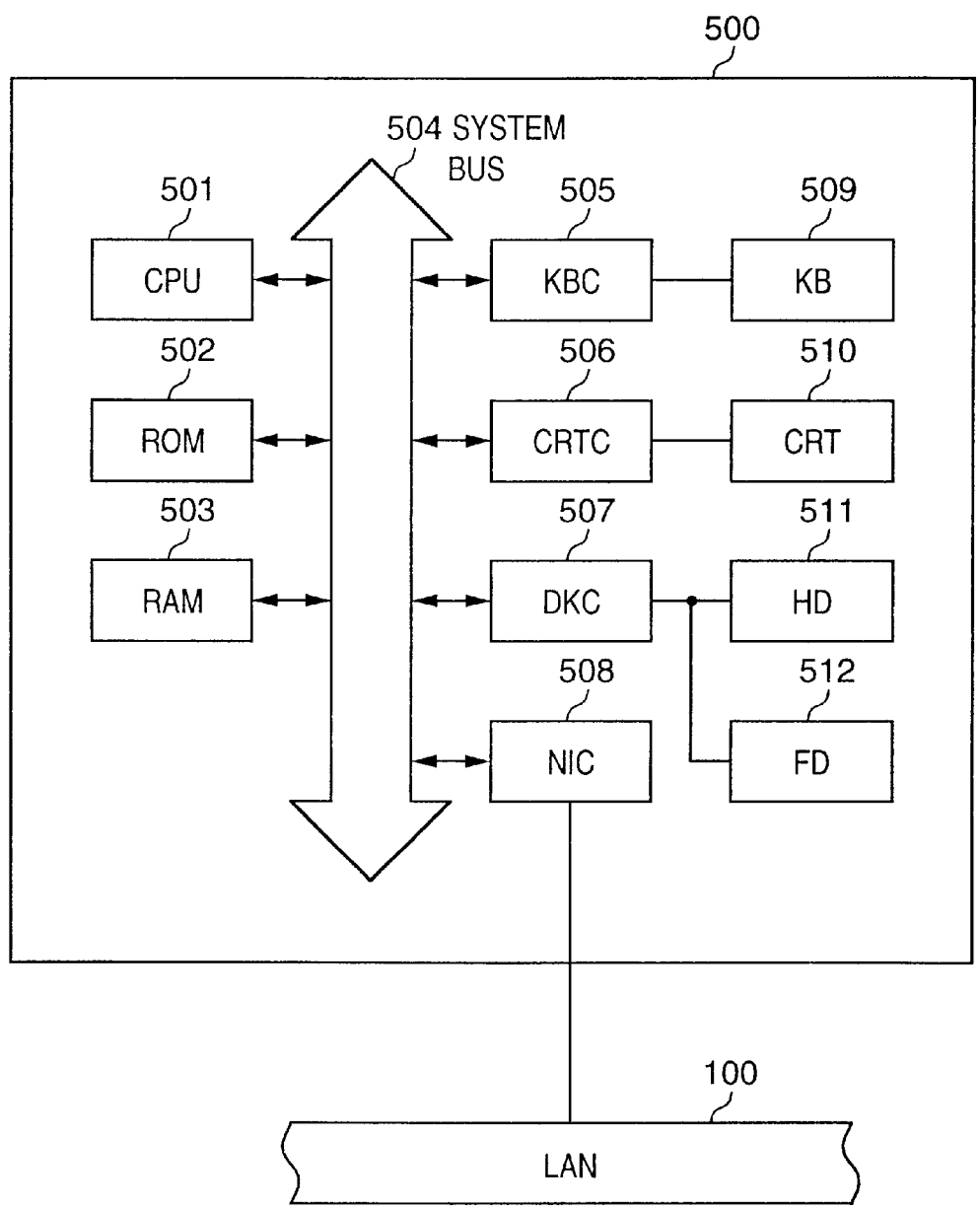
FIG. 5 is a block diagram showing the construction of a personal computer capable of running network management software.

FIG. 5 is a block diagram showing the construction of a PC capable of running network management software.

FIG. 5 shows a PC (computer) 500 which runs network management software, this computer being equivalent to the PC 103 shown in FIG. 1. The PC 500 has a CPU 501 for executing a network management program that has been stored in a ROM 502 or hard disk (HD) 511 or supplied from a floppy disk drive (FD) 512 and stored in a RAM 503. The CPU 501 performs overall control of the devices connected to a system bus 504. The RAM 503 functions as the main memory and also as the work area of the CPU 501. A keyboard controller (KBC) 505 inputs information from a keyboard (KB) 509 and pointing device (not shown), etc, and outputs data to the CPU 501 based on the information. A CRT controller 506 controls displays presented on the CRT display (CRT) 510. A disk controller (DKC) 507 controls the access to the hard disk 511 and floppy disk drive 512 that store a booting program, various applications, edited files, user files and the network management program, etc. A network interface card (NIC) 508 is for a two-way exchange of data with an agent or network device via the LAN 100. It should be noted that while this embodiment is implemented using an ordinary PC having the same construction as the PC shown in FIG. 5, the feature of this embodiment resides in control performed by software, as will be described below.

The network management apparatus according to this embodiment is realized using an ordinary PC having a construction the same as the PC construction shown in FIG. 5, which is capable of implementing a network management apparatus. The program of the network management software according to this embodiment, which program is the operating entity throughout the description to follow, is stored on the hard disk 511. Unless stated otherwise throughout the description to follow, the executing entity in terms of the hardware is the CPU 501. In terms of software, on the other hand, the control entity is the network management software stored on the hard disk 511. Further, in this embodiment, the operating system is assumed to be Microsoft's Windows '95®, though the invention is in no way limited to this operating system. Furthermore, the network management program according to this embodiment may be supplied in a form stored on a storage medium such as a floppy disk or CD-ROM, in which case the program would be installed on the hard disk 511 upon being read from the storage medium by the floppy disk drive 512, shown in FIG. 5, or by a CD-ROM drive, which is not shown.

Figure 6:
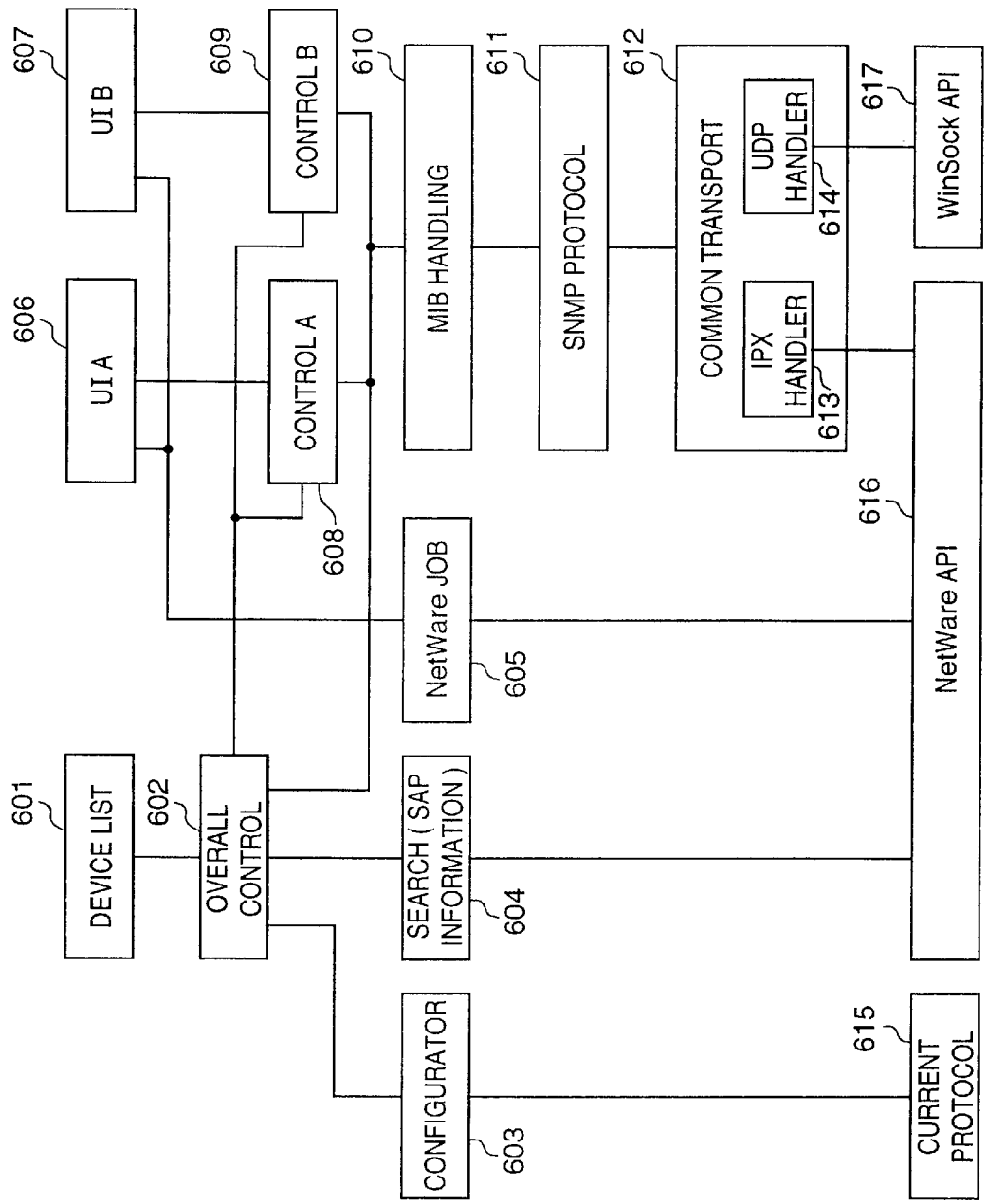
FIG. 6 is a diagram showing the modular construction of network management software.

FIG. 6 is a diagram showing the modular construction of the network management software according to this embodiment of the present invention. The network management software is stored on the hard disk 511 of FIG. 5 and is executed by the CPU 501. At such time the CPU 501 uses the RAM 503 as a work area.

A module 601 in FIG. 6 is referred to as a device list module and is for displaying a list of devices connected to the network. An overall control module 602 supervises the other modules based upon an indication from the device list 501. A configurator module 603 performs special processing relating to the network configuration of an agent. A search module 604 searches for devices connected to the network. Devices searched and found by the search module 604 are displayed in a list by the device list 601. A NetWare® job module 605 acquires the status of a printing job from the network server using a NetWare® API (Applications Programming Interface) 616. (For an explanation of a NetWare® API, see, e.g., "NetWare® Programmer's Guide for C", published by Novell, Inc. This publication can be purchased from Novell, Inc.) UI modules 606, 607 are for displaying windows of device details, described later. A UI module (UI A, UI B) exists for each particular model that displays detailed information. Control modules 608, 609 take charge of control specific to particular models that acquire detailed information. As in the case of the UI modules, the control modules 608, 609 exist for each particular model that displays detailed information. The control modules 608 and 609 acquire MIB data from a managed device using an MIB module 610, convert the data when necessary and deliver the data to the corresponding UI A module 606 and UI B module 607, respectively.

The MIB module 610 converts object identifiers and object keys. An object key is a 32-bit integer having one-to-one correspondence with an object identifier. The object identifier is a variable-length identifier and is troublesome to deal with in terms of installing the network management software. Accordingly, in the network management software according to this embodiment, fixed-length identifiers in one-to-one correspondence with object identifiers are used internally. Modules of an order higher than that of the MIB module 610 handle MIB information using the object key. This makes installing the network management software easier.

An SNMP module 611 is for transmitting and receiving SNMP packets. A common transport module 612 absorbs a difference in respect to a lower protocol that is for transporting SNMP data. In actuality, depending upon the protocol selected by the user at the time of operation, either an IPX handler 613 or a UDP handler 614 has the role of transferring data. The UDP handler 614 uses a WinSock® API 617 as the installer. (For a description of WinSock®, see the specifications of "Windows Socket API", v. 1.1, by way of example. Though this document can be obtained from a number of locations, it is bundled with "Visual C++®", which is a compiler manufactured by Microsoft, Inc.) Current protocol 615 used by the configurator 603 indicates an IPX protocol or UDP protocol selected by the user at the time of operation. In the description rendered below, the network management software according to this embodiment shall be referred to as "NetSpot® 3".

<<Installing NetSpot® 3>>

The files necessary for installing NetSpot® 3 usually are distributed by being recorded on a physical medium such as a floppy disk or CD-ROM or are transmitted over a network. After thus obtaining the files necessary for installation of NetSpot® 3, the user starts the installation of NetSpot® 3 in accordance with a predetermined installation procedure. The procedure for installing NetSpot® 3 is similar to that for installing other ordinary software. That is, when the user starts the NetSpot® 3 installer on a personal computer, the installer executes installation automatically. The installer copies the files necessary for operation of NetSpot® 3 to the hard disk of the PC and, while having the user enter information as it becomes necessary, modifies or creates anew the files needed for operation of NetSpot® 3.

The information that the installer has the user enter at installation of NetSpot® 3 includes selection of two types of operating modes (administrator mode and ordinary user mode), described below.

<<NetSpot® 3 operating mode>>

NetSpot® 3 is capable of operating in two modes, namely an administrator mode and an ordinary user mode, as set forth below. When NetSpot® 3 is installed, the user designates the operating mode that is to be used. In principle, it is necessary to reinstall NetSpot® 3 in order to change its operating mode.

Administrator mode: This is a mode employed by users that have been specifically authorized. Examples of such users are network administrators and network peripherals administrators.

Ordinary user mode: This is a mode employed by ordinary users not having special authorization.

Functions supported in the ordinary user mode are more limited than those supported in the administrator mode. In other words, functions supported in the ordinary user mode correspond to some of the functions supported in the administrator mode.

<<Starting up NetSpot® 3 and authenticating password>>

If NetSpot® 3 has been installed in the ordinary user mode, the user can start up NetSpot® 3 merely by running its execution files. If NetSpot® 3 has been installed in the administrator mode, on the other hand, the user is requested to enter a NetSpot® 3 password immediately after the NetSpot® 3 execution files are executed. The user cannot activate NetSpot® 3 in the administrator mode unless he or she enters the appropriate password. In the administrator mode of NetSpot® 3, it would be possible for the user to make various settings in regard to network peripherals (devices), but if the settings made were erroneous, this might cause device malfunction or failure. Accordingly, in order to make it impossible for an ordinary user to activate the administrator mode, NetSpot® 3 requests that the user enter a NetSpot® 3password when an attempt is made to activate the administrator mode. However, when entry of the NetSpot® 3 has been requested, the user is capable of starting NetSpot® 3 in the ordinary user mode without entering a password.

When NetSpot® 3 is installed in the administrator mode, the user making the installation can set a NetSpot® 3 password at activation of this mode.

Further, after NetSpot® 3 has been started up in the administrator mode, the user is capable of setting or changing the NetSpot® 3 password that activates the administrator mode. The set or modified NetSpot®3 password is used the next time NetSpot® 3 is started in the administrator mode. The administrator mode is activated if the NetSpot® 3 password that was entered at activation of the administrator mode agrees with the actually set value; this mode is not activated if the two fail to agree.

Rather than requesting the user to enter a NetSpot® 3 password at start-up, the NetSpot® 3 administrator mode can also operate so as to check that the user has logged into the NetWare® file server as an administrator. That is, if the user has already logged into the NetWare® file server as an administrator, the request for entry of the NetSpot® 3 password can be dispensed with at activation of the NetSpot® 3 administrator mode.

In actual networks there are a plurality of administrators in a single network environment and administrators differ for each network peripheral (device) In the administrator mode of NetSpot® 3, therefore, it is possible to optionally set, in addition to the NetSpot® 3 password used at activation of the administrator mode, a device password for each network interface board. As a result, when the user has selected a network peripheral from the device list display window, a function for authenticating a device password will be supported for each network peripheral.

The device password used at selection of a network peripheral device can be set by the user for each network interface board when necessary. Assume that a device password has been set for a network interface board. When the user newly selects a network peripheral from the device list display window in the administrator mode of NetSpot® 3, i.e., when the user newly opens the device details window, the device password that was set by the administrator for each network interface board is authenticated.

By setting a device password used when selecting a network peripheral to be the same as the NetSpot® 3 password used when activating the administrator mode, the entry of a device password can be dispensed with when a network peripheral is selected anew from the device list display window in the administrator mode of NetSpot® 3.

<<Exclusive control of NetSpot® 3>>

In a case where a plurality of NetSpot® 3 administrator modes have been activated for a single network peripheral (device), there is the possibility of conflict between a network peripheral (device) setting and a network setting. For this reason, NetSpot® 3 administrator modes capable of being activated in regard to a single network peripheral are limited to a single administrator mode. In other words, the same network peripheral cannot be selected by a plurality of NetSpot®3 administrator modes. By contrast, a plurality of NetSpot® 3 ordinary user modes can be activated in regard to one and the same network peripheral. That is, the same network peripheral can be selected by a plurality of NetSpot® 3 ordinary user modes.

<<Diagram showing transition of windows displayed by NetSpot® 3>>

Figure 7:
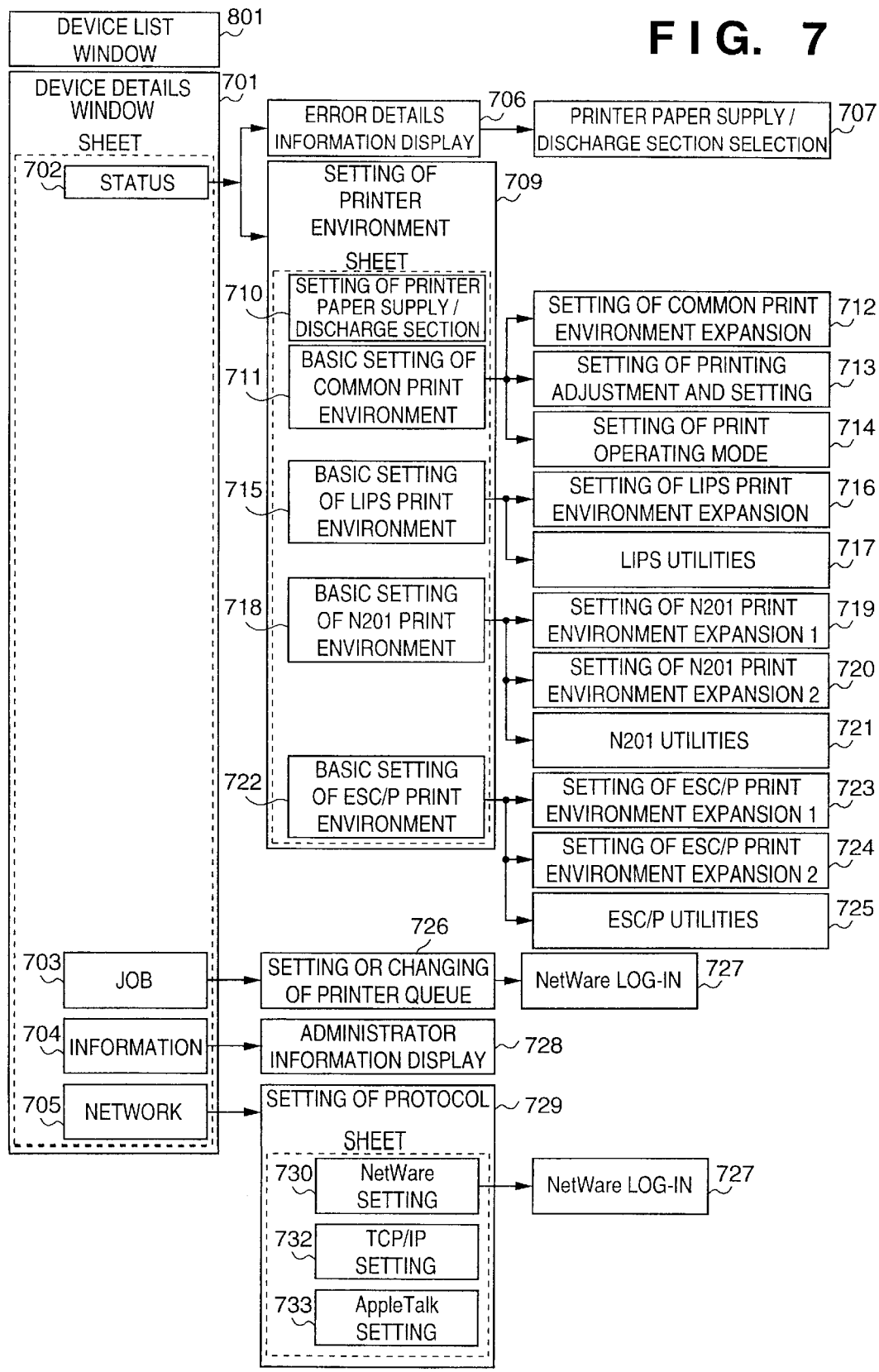
FIG. 7 is a diagram showing a transition of windows when NetSpot® 3 is activated in an administrator mode.
Figure 8:
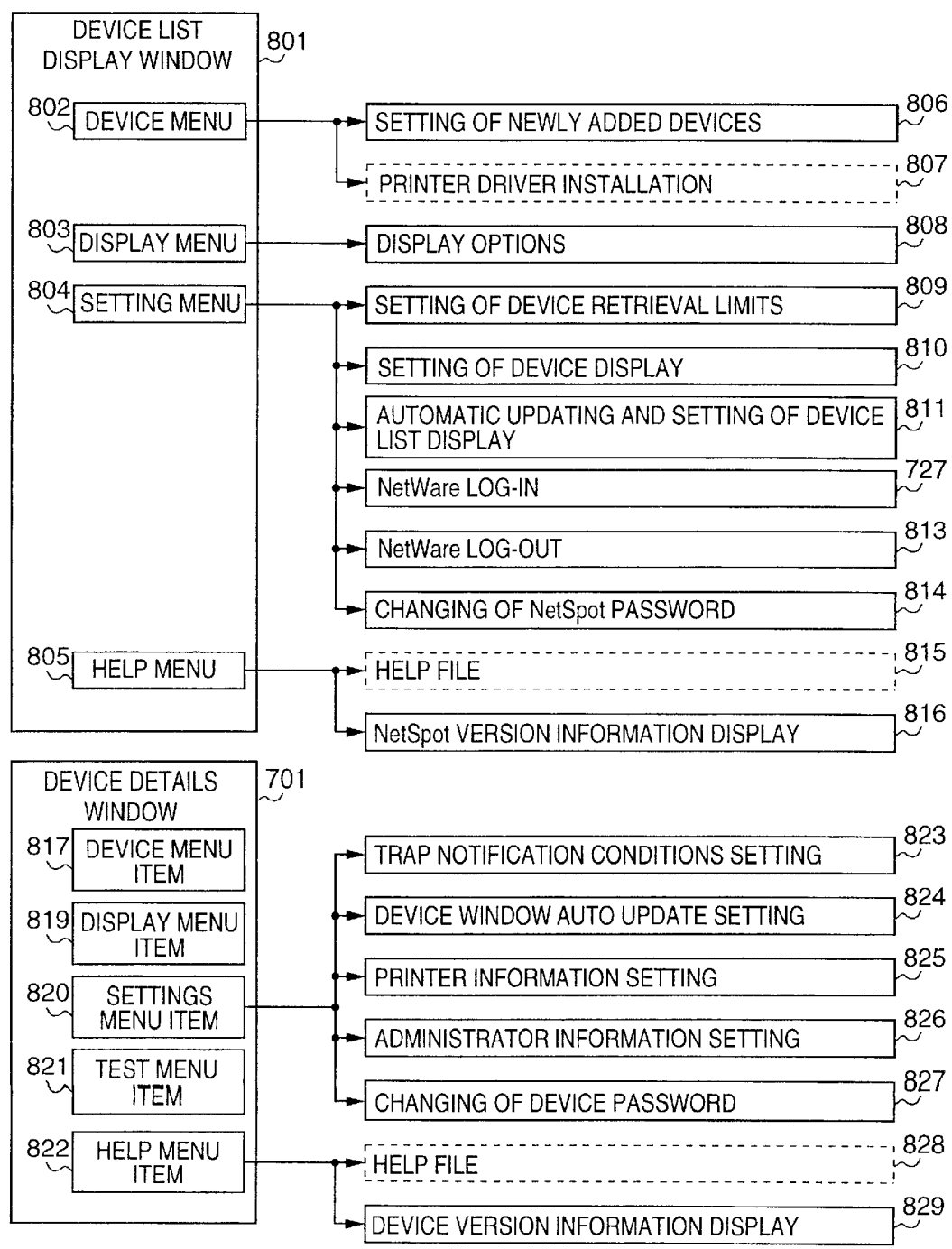
FIG. 8 is a diagram showing a transition of windows when NetSpot® 3 is activated in an administrator mode.

FIGS. 7 and 8 are transition diagrams showing windows displayed successively by NetSpot® 3 in response to user directives when the user has activated NetSpot® 3 in the administrator mode. It should be noted that the windows illustrated in FIGS. 7 and 8 are not all of the windows displayed by NetSpot® 3. NetSpot® 3 displays various windows automatically, in dependence upon the operating status of NetSpot® 3 and information obtained from the network, even in a case where the user has not made any indication.

By observing the information displayed in the various windows displayed by NetSpot® 3, the user monitors the operating states of the network peripherals (devices) and is capable of controlling the network peripherals (devices) by setting the proper values in these windows.

FIG. 7 is a diagram showing a list of dialog boxes that are called from various sheets, described later, when NetSpot® 3 has been activated in the administrator mode.

Figure 9A:
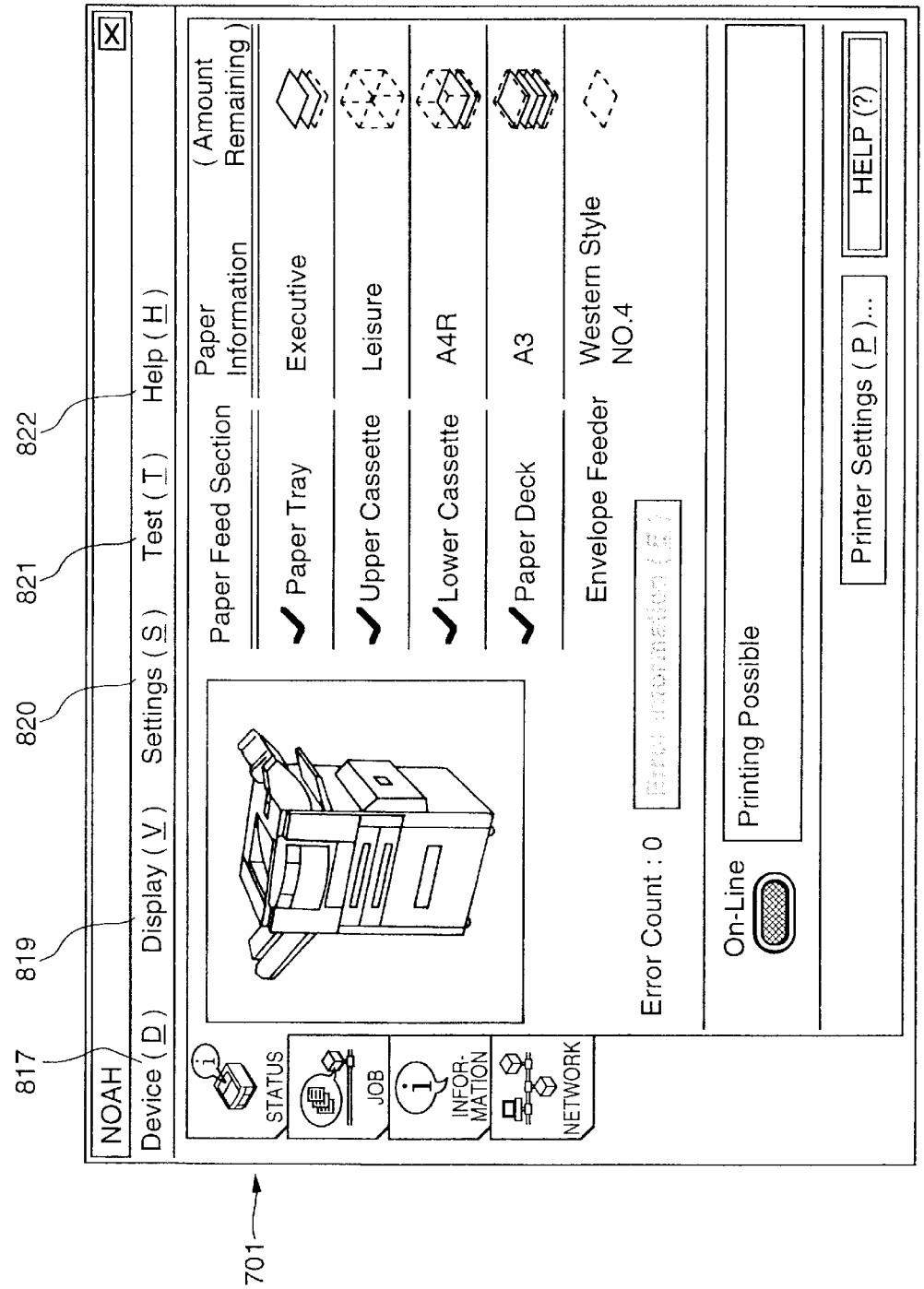
FIGS. 9A–9B is a diagram illustrating an example of a display of a device details window according to this embodiment.
Figure 9B:
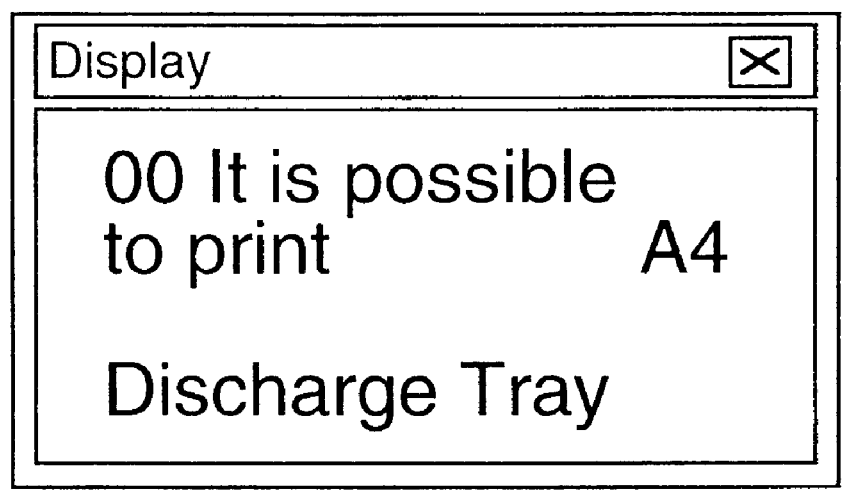

A device details window 701 in FIG. 7 is exemplified in FIGS. 9A and 9B. The device details window 701 has four sheets, namely a status sheet 702, a job sheet 703, an information sheet 704, and a network sheet 705. A dialog box 706 which displays error details information and a dialog box 709 for setting printer environment are displayed from the status sheet 702. A dialog box707 for selecting printer paper supply/discharge sections is selected from the dialog box 706 which displays the error details information.

Figure 10:
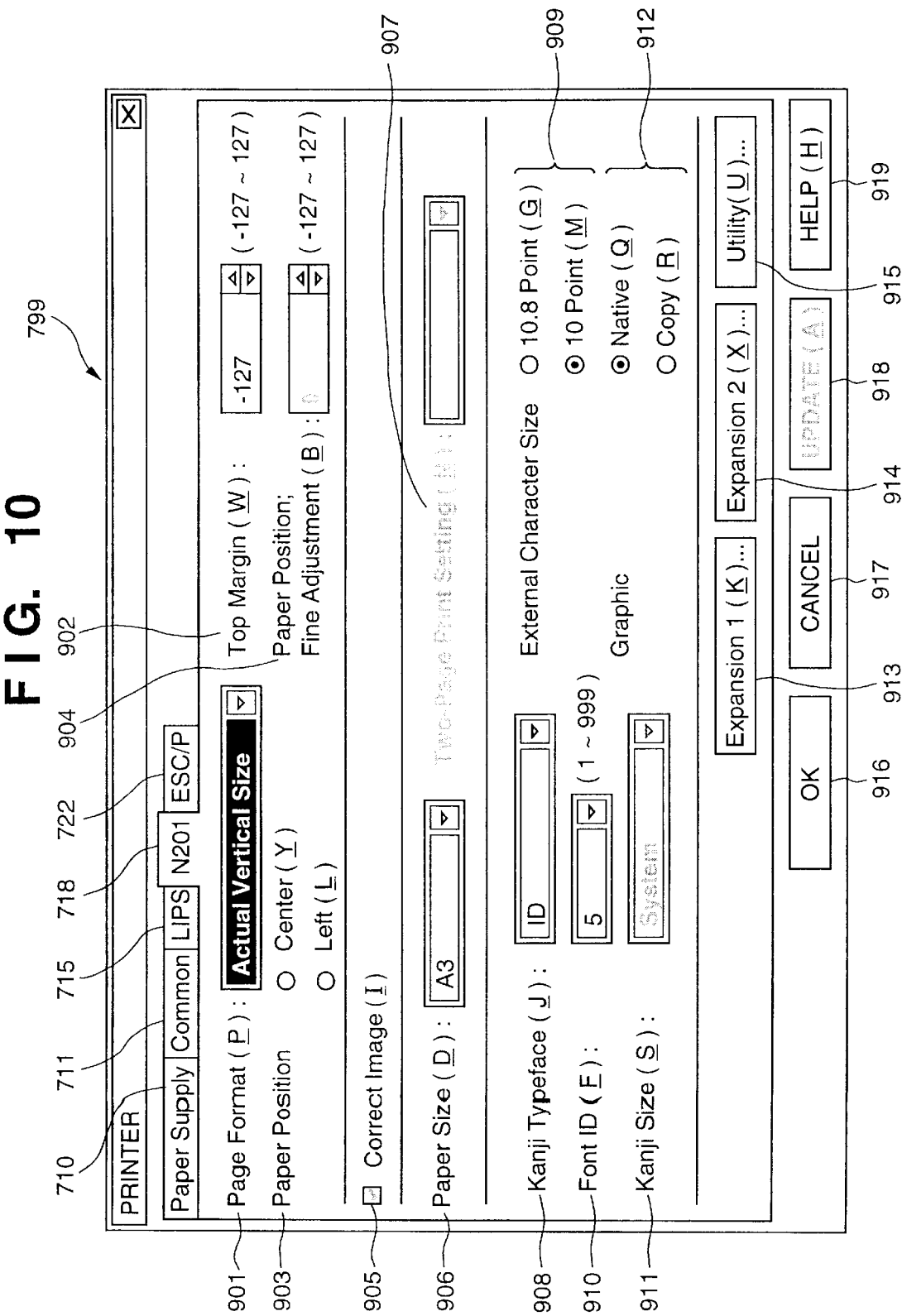
FIG. 10 is a diagram illustrating an example of a display of a basic setting sheet for setting a common print environment.

The dialog box 709 for setting printer environment has five sheets, namely a setting sheet 710 for setting printer paper supply/discharge sections, a setting sheet 711 for setting a basic common print environment, a setting sheet 715 for setting a common LIPS® print environment, a setting sheet 718 for setting a basic N201® print environment, and a setting sheet 722 for setting a basic ESC/P® print environment. These sheets are illustrated in FIG. 10. It should be noted that LIPS®, N201® and ESC/P® are all types of page description languages for printers.

A dialog box 712 for setting an expansion of the common print environment, a dialog box 713 for printing adjustment and setting, and a dialog box 714 for setting a printing operating mode are called from the setting sheet 711 for setting the common print environment.

A dialog box 716 for setting an expansion of the LIPS® print environment and a LIPS® utility dialog box 717 are called from a setting sheet 715 for setting the basic LIPS® print environment.

A dialog box 719 for setting an expansion 1 of the N201 print environment, a dialog box 720 for setting an expansion 1 of the N201® print environment, and an N201® utility dialog box 721 are called from the setting sheet 718 for setting the basic N201® print environment.

A dialog box 723 for setting an expansion 1 of the ESC/P® print environment, a dialog box 724 for setting an expansion 2 of the ESC/P® print environment, and an ESC/P® utility dialog box 725 are called from the setting sheet 722 for setting the basic ESC/P® print environment.

Next, a dialog box 726 for setting or changing a printer queue is called from the job box 703, and a NetWare® log-in dialog box 727 is called from the dialog box 726. Further, an administrator information display dialog box 728 is called from the information sheet 704. Finally, a protocol setting dialog box 729 is called from the network sheet 705.

The protocol setting dialog box 729 has three sheets, namely a NetWare® setting sheet 730, a TCP/IP setting sheet 732 and an AppleTalk® setting sheet 733. A NetWare® log-in dialog box 727 is called from the NetWare® setting sheet 730. A device list display window 801 will be described in detail later in connection with FIG. 8.

FIG. 8 is a diagram showing a list of dialog boxes that are called from various menus, described later, when NetSpot® 3 has been activated in the administrator mode.

The device list display window 801 is illustrated in FIG. 8. This window has four menu items, namely a device menu item 802, a display menu item 803, a setting menu item 804 and a help menu item 805. A dialog box 806 for setting newly added devices and a dialog box 807 for installing a standard printer driver to the operating system are called from the device menu item 802. Next, a display option dialog box 808 is called from the display menu item 803. Further, a dialog box 809 for setting device retrieval limits, a device display setting dialog box 810, a dialog box 811 for automatically updating and setting the device list display, a NetWare® log-in dialog box 727, a NetWare® log-out dialog box 813, and a dialog box 814 for changing a NetSpot® 3 password used when executing NetSpot® 3 are called from the setting menu item 804. Finally, a help file window 815 for displaying NetSpot® 3 help and a dialog box 816 for displaying NetSpot® 3 version information are called from the help menu item 805.

[Device details window (see FIGS. 9A, 9B)]

The device details window 701 shown in FIG. 9A is displayed when the user double clicks on any icon representing a device in the device list display window 801. The number of device details windows 701 the user is capable of opening is limited to one per device. By clicking on any tab ("STATUS", "JOB", "INFORMATION", "NETWORK") on the left side of the device details window 701 (FIG. 9A), the user causes the sheet corresponding to the tab to be moved to the forefront of the device details window 701. The content displayed in the device details window 701 differs depending upon the device. Furthermore, the content displayed in the device details window 701 differs depending upon whether the prevailing mode is the administrator mode or the ordinary user mode. Items displayed and items capable of being changed basically are more limited in the ordinary user mode than in the administrator mode. In a case where an item is not supported because of the particular model of the device, the mode that has been activated or the network protocol being used, the screen displayed is formed in any of the following ways:

(1) The item is grayed-out to render its display invalid or to make any change impossible (basically if there is a possibility that the item will later become valid).

(2) The item itself is not displayed (basically if there is no possibility that the item will later become valid).

(3) The sheet of the device details window itself is grayed-out to render its display invalid or to make its selection impossible (basically if there is a possibility that any item will later become valid when no items relating to a certain tab are supported).

(4) The sheet of the device details window itself is not displayed (basically if there is no possibility that any item will later become valid when no items relating to a certain tab are supported).

In a case where time is needed to register an administrator in an administrator information table of a device selected by the user, a message is displayed to notify the user that registration of the administrator is in progress.

If time is needed to cancel registration of an administrator in the administrator information table of a device selected by the user, a message is displayed to notify the user that administrator registration is currently being canceled.

If time is needed to acquire information from a device selected by the user in a case where any sheet dialog box of the device details window 701 is displayed for the first time, a message is displayed to notify the user that the information is currently being acquired. If acquisition of information is capable of being terminated, a "STOP" button is validated.

If time is needed to set information in a device selected by the user in any sheet dialog box of the device details window 701, a message is displayed to notify the user that the setting of the information is currently in progress. If the setting of information is capable of being terminated, a "STOP" button is validated.

If time is needed to execute resetting of a device selected by the user when executing resetting of a printer or resetting of a network interface board, a message is displayed to notify the user that resetting is in progress. If time is needed to execute a command in a device selected by the user when executing commands other than printer reset and network interface board reset, namely printer online/off-line and paper discharge commands, a printer initialization command, a network interface board initialization command and various utility commands, a message is displayed to notify the user that the command is currently being executed.

The device details window 701 shown in FIG. 9A has five menu items, namely a device menu item 817, a display menu item 819, a settings menu item 820, a test menu item 821 and a help menu item 822. A display dialog box shown in FIG. 9B is displayed by selecting the display menu item 819 under these conditions. This display dialog box displays the content of a display appearing on the control panel of this device.

[Sheet for setting a basic common print environment (see FIG. 10)]

The setting sheet, shown in FIG. 10, that is for setting the basic common print environment is displayed when the user clicks on the tab indicating "COMMON" in the dialog box 709 for setting the printer environment. This sheet is for setting a basic common print environment in a device selected by the user.

[Detailed Specifications]

"PAGE FORMAT" 901 {here [Actual Vertical Size (P)]}: This is for specifying the paper format used in printing.

"TOP MARGIN (W) 902: This specifies the width of the top margin of the paper.

"PAPER POSITION" 903: "Center" or "Left" is specified by a radio button.

"PAPER POSITION; FINE ADJUSTMENT (B)" spin box 904: Printing position can be finely adjusted so as to compensate for positional offset in the printer mechanism.

"IMAGE CORRECTION (I)" 905: Whether image data is to be corrected is designated by a check box.

"PAPER SIZE (D)" 906: This specifies the size of the paper used in printing.

"TWO-PAGE PRINT SETTING (N)" 907: This is used to enter an indication for printing the images of two pages on a single page.

"KANJI TYPEFACE (J)" combo box 908: This specifies the typeface of the kanji used in printing.

"EXTERNAL CHARACTER SIZE" 909: Either 10.8 point or 10 point is specified as the external character size by a radio button.

"FONT ID (E)" 910: This specifies the ID of the font use.

"KANJI SIZE (S)" 911: This is used to select a kanji size specified by the operating system or a kanji size based upon points.

"GRAPHIC" 912: Either native or copy is specified by a radio button.

"EXPANSION 1 (K)" button 913, "EXPANSION 2 (X)" button 914: These are used to designate extended functions.

"UTILITIES (U)" 915: This is used to designate a utility mode.

"OK" button 916: This is used to validate the user's setting of the sheet 711 that sets the basic common print environment; when clicked, this button closes the dialog box. In a case where a setting has been changed by the user, this button is used to update the printer settings.

"CANCEL" button 917: This is used to invalidate the user's setting of the sheet 711 that sets the basic common print environment; when clicked, this button closes the dialog box.

"UPDATE (A)" button 918: If settings on the sheet 711 that sets the basic common print environment have been changed by the user, this button is used to update the printer settings. This button becomes valid only if settings have been changed by the user.

"HELP (H) button 919: By clicking on this button, the user causes on-line help to be displayed.

In FIG. 10, the "PAPER POSITION" radio button 903, the PAPER POSITION; FINE ADJUSTMENT" spin box 904, the "IMAGE CORRECTION" check box 905 and the "KANJI TYPEFACE" combo box 908 are being displayed with their controls placed in the enabled state (a state in which the user can enter values) and with the colors of the characters in the controls presented in the color gray. This indicates that if the particular object fails to be acquired even though the device (the printer) supports this object, a predetermined default value will be set in the control.

In regard to the "TWO-PAGE PRINT SETTING" 907, the device does not support this object. Accordingly, a value has not been set in the control, the control itself has been placed in the disabled state and the color of the characters in the control as well as its background color have been set to gray automatically.

Thus, the content of each control appearing in each window is set in dependence upon the object value acquired from the device. However, since the necessary object cannot always be acquired, NetSpot® 3 according to this embodiment classifies the methods of displaying the controls into the following three categories depending upon the status of object acquisition:

(1) When acquisition of an object has succeeded

The appropriate value is set in the control based upon the object value acquired. In this case the control is enabled (placed in a state in which the user can enter a value) and the color of the characters in the control is not changed.

(2) When the device supports the object but acquisition of the object has failed In this instance a predetermined default value is set in the control (except in the case of a radio button). In this case the control is enabled (placed in a state in which the user can enter a value) and the color of the characters in the control is made gray.

(3) When the device does not support the object

In this instance no value is set in the control, the control itself is disabled (will not allow input of a value from the user) and the color of the characters in the control as well as the background color is made gray.

Thus, NetSpot® 3 according to this embodiment makes it possible to display three states even for combo boxes and list boxes using custom controls and, in the case of (2) above, sets default values.

Figure 11:
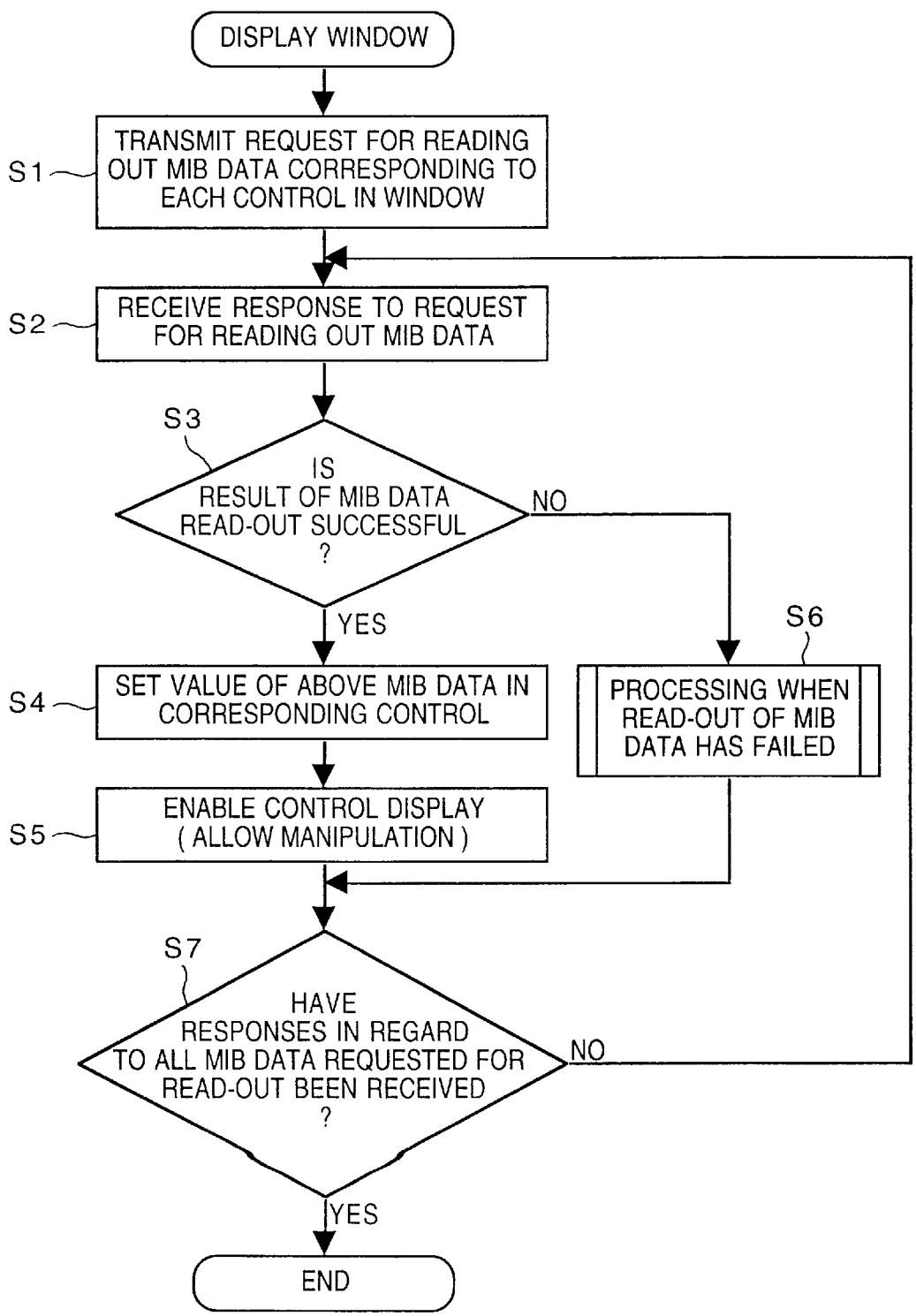
FIG. 11 is a flowchart illustrating processing for displaying a window of the kind shown in FIG. 10 according to this embodiment.

FIG. 11 is a flowchart illustrating processing for displaying a window of the kind shown in FIG. 10 according to this embodiment. This processing is executed by, e.g., the control modules 608, 609, etc., shown in FIG. 6.

Execution of this processing is started by designating display of, e.g., the sheet (FIG. 10) that is for setting the basic common print environment. First, at step S1, a request for reading out the MIB data that corresponds to each control in the window is transmitted. When a response to this request for read-out of the MIB data is received at step S2, the program proceeds to step S3, at which it is determined whether read-out of the MIB data has succeeded or not. If read-out has succeeded, the program proceeds to step S4, where the value of the MIB data is set in the corresponding control. This is followed by step S5, at which a display is established indicating that the state of a control display is capable of being manipulated (i.e., that the control has been enabled). An example of such a display is the display of "PAGE FORMAT" 901 or the display of "KANJI TYPEFACE" 908 in the example of FIG. 10.

Figure 12:
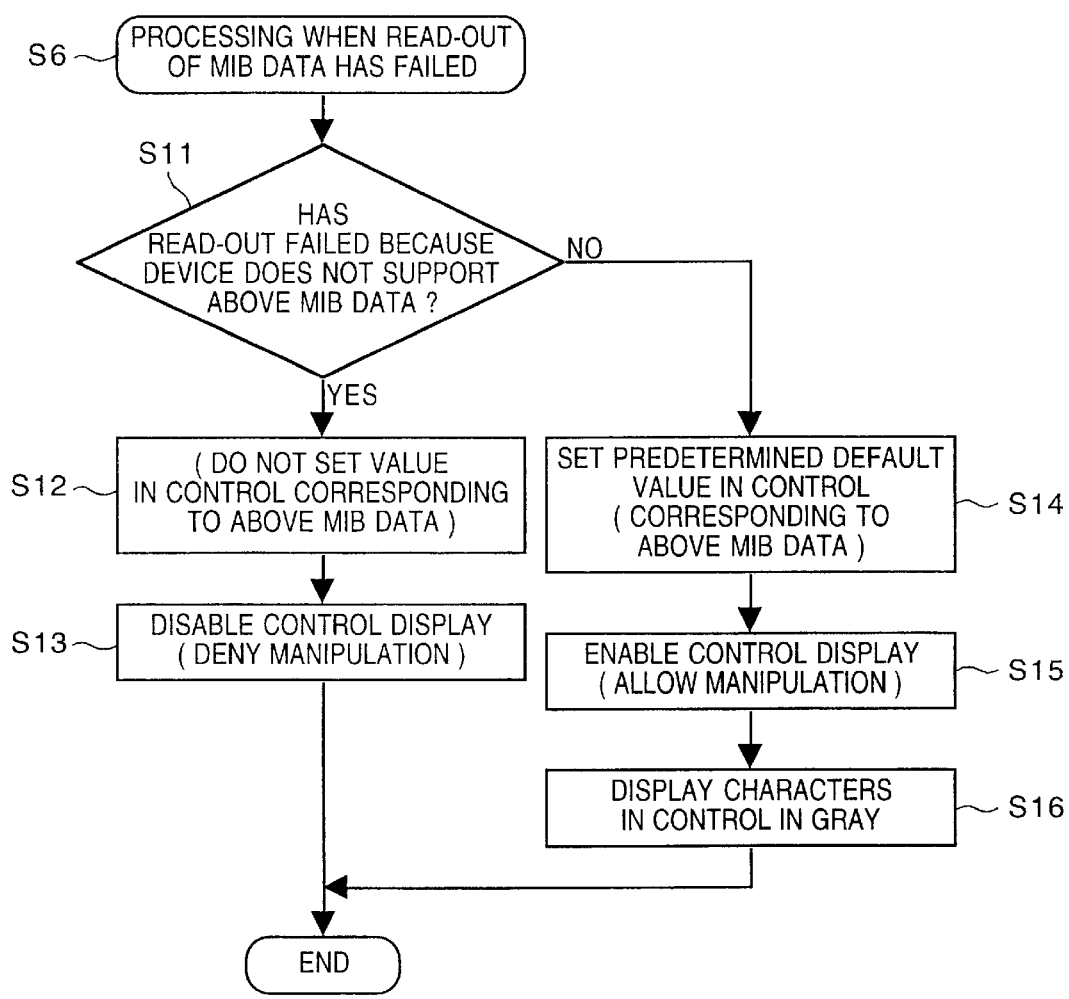
FIG. 12 is a flowchart illustrating processing executed when readout of MIB data at step S6 in FIG. 11 fails.

If it is found at step S3 that read-out of MIB data has failed, then the program proceeds to step S6, at which the processing illustrated in FIG. 12 is executed. (This processing will be described later with reference to FIG. 12.)

When the processing of step S5 or step S6 is finished, the processing proceeds to step S7. Here it is determined whether responses in regard to all MIB data for which read-out responses have been transmitted at step S1 have been received. If the decision rendered is "NO", the program returns to step S2 and the above-described processing is executed again. If responses in regard to all MIB data are received, then this processing is terminated.

FIG. 12 is a flowchart illustrating the processing of step S6 shown in FIG. 11. When read-out of the MIB data has failed, it is determined at step S11 whether the reason for this is that the device does not support the MIB data read out. If the decision is "YES", the program proceeds to step S12, where a value is not set in the control corresponding to this MIB data, and thence to step S13, at which a display (the name of the control in the color gray) is established indicating that the state of this control display is not capable of being manipulated (i.e., that the control has been disabled). This corresponds to the display of "TWO-PAGE PRINT SETTING" 907 in FIG. 10.

If read-out has failed but the reason for the failure is not that the device does not support this MIB data, then the program proceeds to step S14. Here a predetermined default value is set in the control that corresponds to this MIB data. This corresponds to the display of the numerical value "0" at "PAPER POSITION; FINE ADJUSTMENT" 904 or to the display of "SYSTEM" at "KANJI SIZE" 911 in the example of FIG. 10. Next, the program proceeds to step S15, at which a display (usually a display of the control name) is established indicating that the state of this control display is capable of being manipulated. The default value is then displayed in gray at step S16. This corresponds to the display of the numerical value "0" at "PAPER POSITION; FINE ADJUSTMENT" 904 or to the display of "SYSTEM" at "KANJI SIZE" 911 in the example of FIG. 10.

Thus, unlike the prior art, in which the states of set values are limited to "already set", "not yet set" and "not settable", this embodiment of the present invention, as described above, makes it possible to display a larger number of states In accordance with this embodiment, as described above, regardless of whether a box displayed in a window is a control box or a list box, etc., the states of value settings are not limited to "already set", "not yet set" and "not settable", as in the prior art. The present invention make it possible to display a larger number of states.

The present invention can be applied to a system constituted by a plurality of devices (e.g., a host computer, interface, reader, printer, etc.) or to an apparatus comprising a single device (e.g., a copier or facsimile machine, etc.).

Further, though the invention has been described based upon an embodiment in which a device has been connected to a network, the invention is not limited to such an arrangement. For example, the present invention is applicable to a computer or the like having a device such as a printer connected thereto.

Further, though the invention has been described based upon an embodiment in which a display indicative of a disabled state is presented as a gray display, the invention is not limited to such an arrangement.

Further, it goes without saying that the object of the present invention can also be achieved by providing a storage medium storing program codes of software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus capable of setting the environment of a device connected thereto, comprising:

display means for displaying an environment setting screen which is for setting the environment of the device;

discriminating means for determining whether it is possible to acquire data corresponding to a control on the environment setting screen displayed on said display means;

manipulation-enabled display means for displaying the control in a first mode if said discriminating means has determined that said data is capable of being acquired;

manipulation-disabled display means for displaying the control in a second mode if a function corresponding to the control on the environment setting screen is not supported by the device; and display control means for setting a default value in the control and displaying the control in a third mode if a function corresponding to the control on the environment setting screen is supported by the device and, moreover, said discriminating means has determined that the data corresponding to the control is incapable of being acquired.

2. The apparatus according to claim 1, wherein said discriminating means determines that acquisition of the data corresponding to the control is possible if management information relating to the connected device could be read out of a management information unit storing management information relating to said device.

3. The apparatus according to claim 1, wherein said manipulation-enabled display means displays a name of the control and data corresponding to said control.

4. The apparatus according to claim 1, wherein said manipulation-disabled display means displays a name of the control in a color or at a brightness approximating that of the background and erases display of data corresponding to said control.

5. The apparatus according to claim 1, wherein said display control means displays a name of the control at ordinary brightness and displays a default value corresponding to said control in a color or at a brightness approximating that of the background.

6. The apparatus according to claim 1, wherein a name of the control is displayed in gray in the second mode and the default value is displayed in gray in the third mode.

7. The apparatus according to claim 1, wherein the device is a printer.

8. An information processing method capable of setting the environment of a connected device, comprising:

a display step of displaying an environment setting screen which is for setting the environment of the device;

a discriminating step of determining whether it is possible to acquire data corresponding to a control on the environment setting screen displayed by said display step;

a step of displaying the control in a first mode if it has been determined by said discriminating step that said data is capable of being acquired;

a step of displaying the control in a second mode if it has been determined by said discriminating step that said data is incapable of being acquired and, moreover, a function corresponding to the control on the environment setting screen is not supported by the device; and a step of setting a default value in the control and displaying the control in a third mode if a function corresponding to the control of the environment setting screen is supported by the device and, moreover, it has been determined by said discriminating step that said data is incapable of being acquired.

9. The method according to claim 8, wherein a name of the control and data corresponding to said control are displayed at ordinary brightness in the first mode.

10. The method according to claim 8, wherein a name of the control is displayed in a color or at a brightness approximating that of the background and display of data corresponding to said control is erased in the second mode.

11. The method according to claim 8, wherein a name of the control is displayed at ordinary brightness and a default value corresponding to said control is displayed in a color or at a brightness approximating that of the background in the third mode.

12. The method according to claim 8, wherein a name of the control is displayed in gray in the second mode and the default value is displayed in gray in the third mode.

13. The method according to claim 8, wherein the device is a printer.

14. The method according to claim 8, wherein the data is displayed in a combo box.

15. A network device control apparatus for setting the state of a device connected to the apparatus via a network, comprising:

display means for displaying an environment setting window which is for setting the environment of the device;

discriminating means for determining whether it is possible to acquire data corresponding to a control in the environment setting window displayed on said display means;

means for displaying the control in a first mode if said discriminating means has determined that said data is capable of being acquired;

means for displaying the control in a second mode when a function corresponding to the control in the environment setting window is not supported by the device; and means for setting a default value in the control and displaying the control in a third mode if a function corresponding to the control in the environment setting window is supported by the device and, moreover, said discriminating means has determined that said data is incapable of being acquired.

16. The apparatus according to claim 15, wherein a name of the control and data corresponding to said control are displayed at ordinary brightness in the first mode.

17. The apparatus according to claim 15, wherein a name of the control is displayed in a color or at a brightness approximating that of the background and display of data corresponding to said control is erased in the second mode.

18. The apparatus according to claim 15, wherein a name of the control is displayed at ordinary brightness and a default value corresponding to said control is displayed in a color or at a brightness approximating that of the background in the third mode.

19. The apparatus according to claim 15, wherein a name of the control is displayed in gray in the second mode and the default value is displayed in gray in the third mode.

20. The apparatus according to claim 15, wherein the device is a printer.

21. The apparatus according to claim 15, wherein said discriminating means determines that acquisition of the data corresponding to the control is possible if management information relating to the device, which is connected via the network, could be read out of a management information unit storing management information relating to said device.

22. A network device control method for setting the state of a device connected via a network, comprising:

a display step of displaying an environment setting window which is for setting the environment of the device;

a discriminating step of determining whether it is possible to acquire data corresponding to a control in the environment setting window displayed by said display step;

a step of displaying the control in a first mode if it has been determined by said discriminating step that said data is capable of being acquired;

a step of displaying the control in a second mode when a function corresponding to the control in the environment setting window is not supported by the device; and a step of setting a default value in the control and displaying the control in a third mode if a function corresponding to the control in the environment setting window is supported by the device and, moreover, it has been determined by said discriminating step that said data is incapable of being acquired.

23. The method according to claim 22, wherein a name of the control and data corresponding to said control are displayed at ordinary brightness in the first mode.

24. The method according to claim 22, wherein a name of the control is displayed in a color or at a brightness approximating that of the background and display of data corresponding to said control is erased in the second mode.

25. The method according to claim 22, wherein a name of the control is displayed at ordinary brightness and a default value corresponding to said control is displayed in a color or at a brightness approximating that of the background in the third mode.

26. The method according to claim 22, wherein a name of the control is displayed in gray in the second mode and the default value is displayed in gray in the third mode.

27. The method according to claim 23, wherein the device is a printer.

28. The method according to claim 23, wherein it is determined by said discriminating step that acquisition of the data corresponding to the control is possible if management information relating to the device, which is connected via the network, could be read out of a management information unit storing management information relating to said device.

29. A computer readable storage medium storing a program which executes a network device control method for setting the state of a device connected via a network, comprising:

a module for a display step of displaying an environment setting window which is for setting the environment of the device;

a module for a discriminating step of determining whether it is possible to acquire data corresponding to a control in the environment setting window displayed by said module for the display step;

a module for a step of displaying the control in a first mode if it has been determined by said module for the discriminating that said data is capable of being acquired;

a module for a step of displaying the control in a second mode when a function corresponding to the control in the environment setting window is not supported by the device; and a module for a step of setting a default value in the control and displaying the control in a third mode if a function corresponding to the control in the environment setting window is supported by the device and, moreover, it has been determined by said module for the discriminating step that said data is incapable of being acquired.

30. The storage medium according to claim 29, wherein a name of the control and data corresponding to said control are displayed at ordinary brightness in the first mode.

31. The storage medium according to claim 29, wherein a name of the control is displayed in a color or at a brightness approximating that of the background and display of data corresponding to said control is erased in the second mode.

32. The storage medium according to claim 29, wherein a name of the control is displayed at ordinary brightness and a default value corresponding to said control is displayed in a color or at a brightness approximating that of the background in the third mode.

33. The storage medium according to claim 29, wherein it is determined by said module of the discriminating step that acquisition of the data corresponding to the control is possible if management information relating to the device, which is connected via the network, could be read out of a management information unit storing management information relating to said device.

* * * * *

UNITED STATES PATENT AND TRADEMARK OFFICE
CERTIFICATE OF CORRECTION

PATENT NO. : 6,029,198
DATED : February 22, 2000
INVENTOR(S) : YOSHIO IIZUKA

It is certified that error appears in the above-identified patent and that said Letters Patent is hereby corrected as shown below:

COLUMN 4

Line 28, "numbered" should read --numbers--.

COLUMN 8

Line 65, "(device)" should read --(device).--.

COLUMN 14

Line 31, "states" should read --states.--.
Line 36, "make" should read --makes--.

Signed and Sealed this

Thirteenth Day of February, 2001

Attest:

NICHOLAS P. GODICI

Attesting Officer

Acting Director of the United States Patent and Trademark Office